Figure 1:
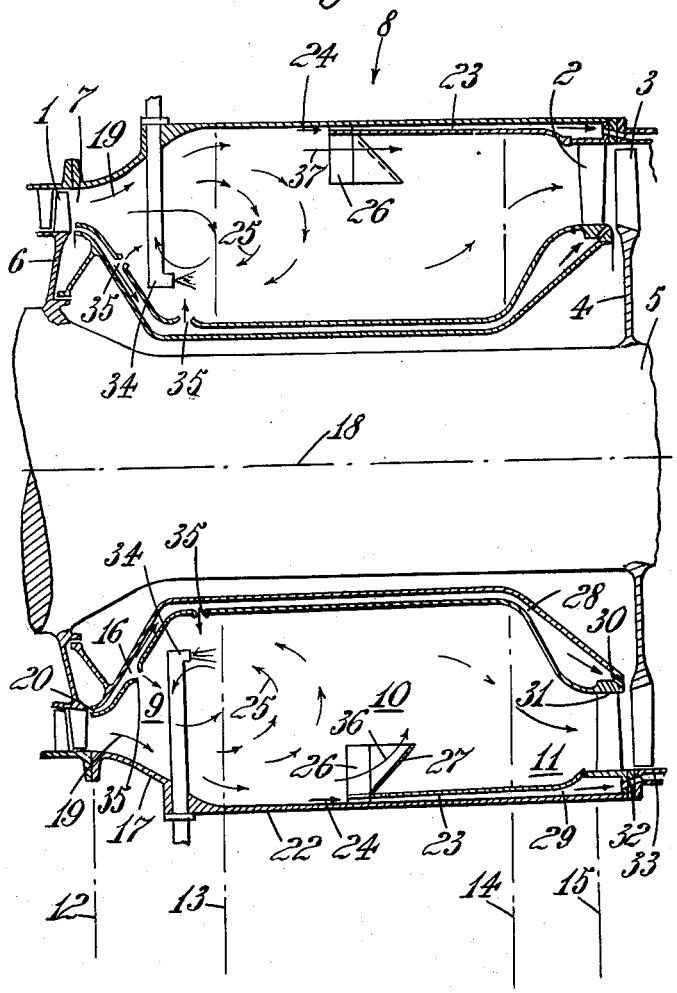

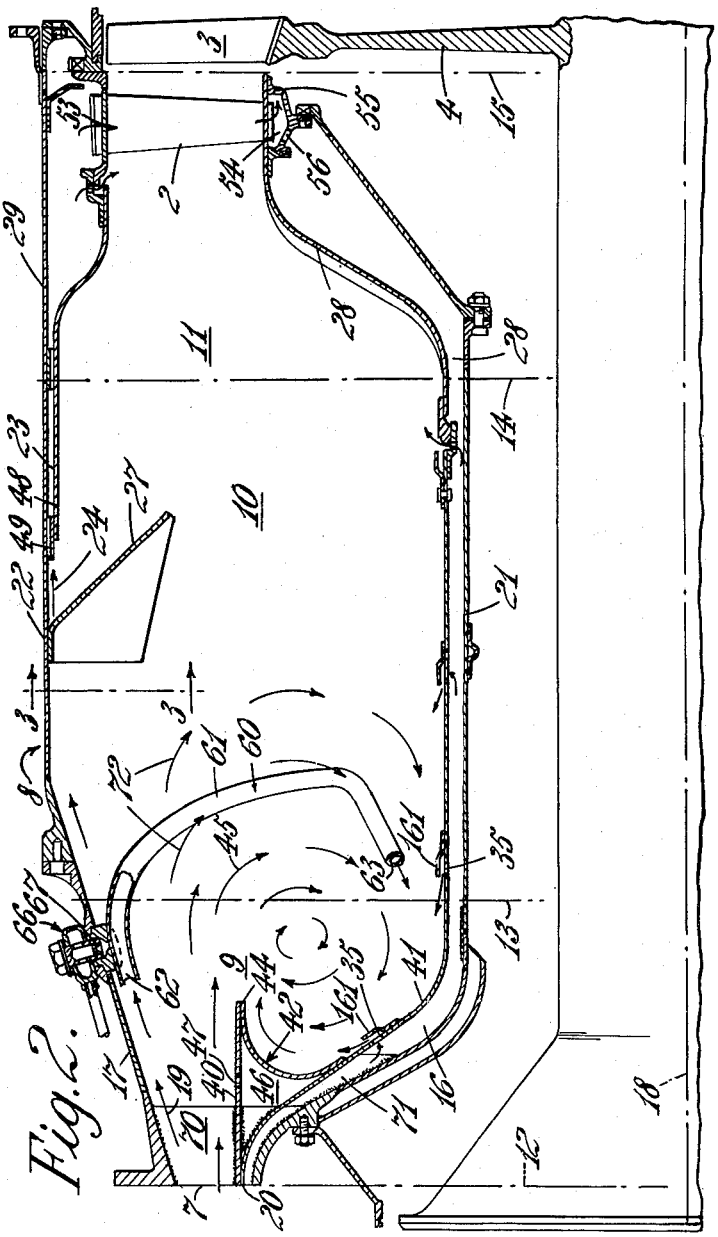

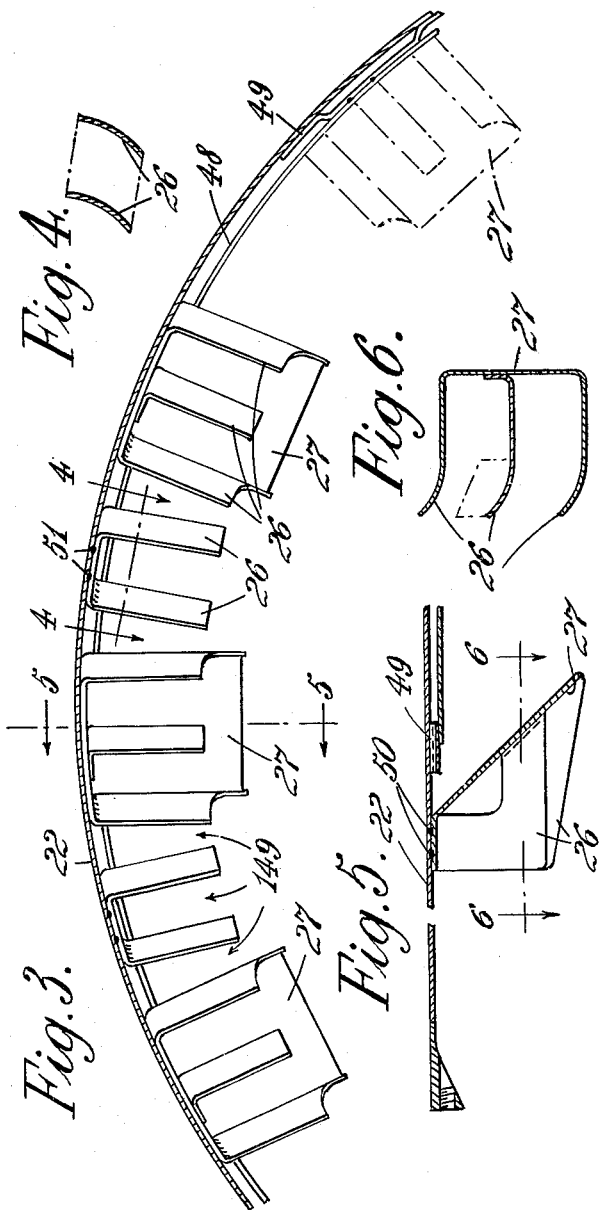

United States Patent Office 2,977,760
Patented Apr. 4, 1961

2,977,760

ANNULAR COMBUSTION CHAMBERS FOR USE WITH COMPRESSORS CAPABLE OF DISCHARGING COMBUSTION SUPPORTING MEDIUM WITH A ROTARY SWIRL THROUGH AN ANNULAR OUTLET

William Ernest Soltau and Peter Frederick Orchard, Bristol, England, assignors, by mesne assignments, to Bristol Aero-Engines, Limited, Bristol, England, a British company Filed Mar. 12, 1956, Ser. No. 571,049

Claims priority, application Great Britain Mar. 16, 1955

9 Claims. (Cl. 60—39.65)

This invention relates to the arrangement and construction of combustion chambers for use in combination with compressors capable of discharging combustion-supporting medium with a rotary swirl through an annular outlet.

For use in gas turbine engines comprising compressor systems of which the highest pressure stages are of the axial flow or centrifugal type it is known to provide a combustion chamber comprising inner and outer walls formed as surfaces of revolution about a common axis which will be coincident with the shaft axis of the engine. Such chambers have a divergent entry portion and a convergent outlet portion and contain a so-called flame-tube structure comprising walls which are spaced from the inner and outer walls and constrain part of the inflow of combustion-supporting medium to flow over the inner and outer walls and enclose a space wherein turbulent flow conditions are produced appropriate for the maintenance of stable combustion of fuel dispersed into the said space. Such combustion chambers comprise or are used in combination with a divergent diffusing passage leading from the outlet of the compressor to the inlet of the combustion chamber proper, and the compressor is provided with a stationary row of guide vanes to deflect the air, which is discharged from the last row of moving blades with a substantial circumferential component, into the axial direction before it enters the said diffusing passage.

The object of the present invention is to provide a simplified combustion chamber adapted to use without either a diffusing passage or a final row of stationary guide blades on the compressor with which it is associated and which will therefore result in a substantial reduction in the length of the compressor-combustion chamber assembly.

According to the invention a combustion chamber comprises an entry portion, a body portion and an outlet portion, the entry portion comprising inner and outer wall structures each formed as a surface of revolution about a common axis and forming between them at one end an axially directed annular inlet opening for gaseous combustion-supporting medium, the parts of said inner and outer wall structures adjacent the inlet opening being respectively so directed relatively to the direction of inflow of combustion-supporting medium that during operation of the combustion chamber a greater part of said inflow naturally flows along the outer wall structure in the form of a sheath while a lesser part of said inflow forms a turbulent zone between the inner wall structure and the inner surface of said sheath, the body portion comprising inner and outer wall structures each constituting a continuation in a generally axial direction of the corresponding wall structure of the entry portion and the said outer wall structure comprising at a point part way along its length means for causing a breakaway of part of the sheath of gaseous medium flowing along it from the outer wall structure of the entry portion, said outlet portion comprising inner and outer wall structures, each constituting a continuation of the corresponding wall structure of the body portion, the inner and outer wall structures of said outlet portion each converging to an annular outlet opening, and the combustion chamber also comprising means for dispersing fuel into said turbulent zone.

According to a feature of the present invention, the inner and outer wall structures of said entry portion may each diverge from said entry opening. Alternatively however the inner wall structure of said entry portion may have a part adjacent said annular inlet which extends in the axial direction, and a subsequent part which diverges with respect to the axial direction, the wall structure being stepped inwardly between said axially extending part and said divergent part.

When the alternative construction just described is adopted, it is preferred that said step be undercut and shaped so as to promote the formation of a toroidal vortex in said turbulent zone during operation of the combustion chamber.

According to a further feature of the invention, the inner wall structures of the entry, body and outlet portions may each be of double-walled construction open at said inlet opening to allow a flow of combustion-supporting medium therethrough for cooling purposes.

According to a further feature of the invention, the outer wall structure of the outlet portion and the outer wall structure of at least a part of the body portion lying downstream of the means for causing a breakaway may be of double walled construction with an opening to allow a flow of combustion-supporting medium therethrough for cooling purposes.

According to a still further feature of the invention, there may be provided upstream of the means for causing a breakaway a row of guide blades projecting radially inwardly from the outer wall structure and adapted to deflect gaseous medium entering between them with a substantial circumferential component of motion into a substantially axial direction.

The invention also includes the combination of a combustion chamber according to the invention with a compressor system capable of discharging combustion-supporting medium with a rotary swirl through an annular outlet, said outlet being connected directly to said annular inlet of the combustion chamber without the intermediary of either stationary swirl-removing guide blades or a diffusing passage.

In operation, air is discharged from the compressor with a substantial angle of swirl and a main part, constituting dilution air, follows a spiral course round the contour of the outer wall of the combustion chamber until it reaches the deflecting blades and the means producing a breakaway, a further part of the entering air passes through the double inner wall structure and cools this structure, while a third part, constituting primary air, forms a toroidal vortex downstream of the inner wall of the entry portion of the chamber or said axially extending part of said inner wall structure of the entry portion. Fuel is dispersed into this toroidal vortex for combustion therein, end products of combustion from the periphery of the vortex mix with the dilution air where this latter is caused to break away from the outer wall structure, the mixed products of combustion and dilution air leaving by way of the annular outlet opening.

Two embodiments of the present invention will now be described by way of example with reference to the accompanying drawings whereof:

Figure 1 is a cross sectional side elevation of a combustion chamber according to the invention together with related compressor parts forming part of a gas turbine engine, Figure 2 is a corresponding partial view showing a modified combustion chamber according to the invention, Figure 3 is a partial cross-section on line 3—3 of Figure 2, Figure 4 is a cross-section on line 4—4 in Figure 3, Figure 5 is a cross-section on line 5—5 in Figure 3, and Figure 6 is a cross-section on line 6—6 in Figure 5.

Referring to Figure 1 the reference numeral 1 indicates the last row of moving blades of an axial flow compressor, and the reference numerals 2 and 3 indicate respectively a row of stationary turbine guide blades and a row of moving turbine blades. The moving turbine blades are carried by a rotor 4 attached to a shaft 5 which also carries a drum structure 6 on which the compressor blades 1 are mounted. Air discharging from the compressor blades 1 with a substantial circumferential swirl component enters directly the axially directed annular inlet 7 of a combustion chamber denoted generally by the reference numeral 8. The combustion chamber comprises an entry portion 9, a body portion 10 and an outlet portion 11, these portions being considered to lie between the transverse planes 12, 13, 14 and 15.

The entry portion 9 comprises a double-walled inner wall structure 16 and an outer single wall 17 both formed as surfaces of revolution about the shaft axis 18 and both of which diverge from the annular inlet 7. The outer wall 17 diverges outwardly from the axial direction of the air flowing in through the opening 7 however only to an extent which allows a greater part of the inflowing air to flow naturally (i.e. without positive constraint) in a spiral path along the outer wall 17 in the form of a sheath as indicated by the arrows 19. The inner wall structure 16, on the other hand, in the example at present being described, diverges inwardly from the axial inflow direction much more sharply so that a lesser part of the inflow from part of the inlet opening adjacent the inlet end of the wall structure 16, forms, possibly with some air detached from the inner surface of the said sheath, a turbulent zone between the inner wall structure 16 and the inner surface of the sheath as indicated by the arrows 25. The two walls of the double-walled structure 16 define between them an axially directed inlet opening 20 into which a small part of the air leaving the compressor flows for the purpose of cooling these walls.

The body portion 10 comprises inner and outer wall-structures 21 and 22 each constituting a continuation in a generally axial direction of the walls 16 and 17 of the entry portion. For about the second half of its length the outer wall is also of double construction to provide a passage 23 for relatively cool air entering as indicated by the arrows 24 through inlet openings upstream of the chute-like deflectors 27 later described. As already stated, the greater part of the air discharged from the compressor follows the outer wall 17 in a generally spiral path and thus forms a relatively cool sheath over this wall. A row of guide blades 26 is provided on the outer wall 22 of the body portion to deflect the spirally flowing sheath of air into a more axial direction. Across the alternate gaps between adjacent pairs of blades 26 downstream of the blades is arranged intermittent breakaway causing means in the form of chute-like deflectors 27 which deflect the air flowing through these gaps towards the axis 18 as indicated by the arrow 36, thus causing it to break away from the outer wall 22. The air flowing through the intermediate gaps between the deflectors 27 continues along the wall 22 as indicated by the arrow 37.

The outlet portion 11 comprises mutually convergent inner and outer wall structures 28 and 29 each constituting a continuation of the corresponding wall structures 21 and 22 of the body portion the inner and outer wall structures of said outlet portion each conveying to an annular outlet opening adjacent the turbine guide blades 2. Cooling air from between the walls of the inner wall structure passes out through openings 30 in the guide blade mounting 31 to mix with the air flowing between the guide blades into the moving turbine blade row 3, while cooling air from between the outer-double-walled structure 23 passes out through openings 32 into a double-walled turbine casing structure 33.

Fuel is dispersed into the turbulent zone indicated by the arrows 25 by means of spraying injectors 34. A small amount of air is also admitted into this zone through openings 35 in the inner double-walled structure 16 to promote circulation in the burning zone, this circulation taking the form of a single large toroidal vortex from which products of combustion disperse to mix with the main flow of dilution air where this is caused to break away from the outer wall of the combustion chamber by the deflectors 27.

Various proposals for fully annular combustion chambers have already been made, but in most cases the flow pattern has been similar to that usual in pipe chambers, i.e. a series of discrete toroidal vortices particular to each fuel injection point. The achievement of a satisfactory annular chamber in this way requires a large number of injection points. The use of a single large toroidal vortex as in the present invention constitutes an improvement in that the flow pattern is not dependent upon the number of injection points. This pattern is therefore more suited to the achievement of the minimum size annular combustion chamber. Further advantages derive from the fact that the dilution air by-passes the combustion zone at a higher velocity than is possible with the known arrangements, and that the use of a single large vortex enables maximum use to be made of the available space besides allowing a higher intensity of combustion because of the larger scale of the vortex.

Figures 2 to 6 show a modified form of the combustion chamber described with reference to Figure 1, and in Figures 2 to 6 parts corresponding to parts already described with reference to Figure 1 are indicated by the same reference numerals as have been used in Figure 1.

Referring to Figure 2 it will be seen in this case that the inner wall structure 16 of the inlet portion 9 is formed with a part 40 adjacent the inlet 7 which extends in the axial direction, the part being built up from the subsequent divergent part 41 to form an annular shelf. The structure 16 is stepped inwardly from the part 40 to the subsequent divergent part 41 as at 42 and the annular step is undercut, the step being concavely curved so as to provide an annular wall portion shaped to correspond with the toroidal vortex which in the present example is formed downstream of the edge 44 as shown by the arrows 45. The part 40 and the stepped part 42 enclose with the wall 16 proper a space 46 which is vented through a series of apertures 47 to equalize the pressure in the space 46.

A further modification lies in the disposition and arrangement of the guide blades 26 and the deflectors 27. As may be seen from Figure 2 the inlet openings 48 to the cooling passage 23 are disposed downstream of the deflectors 27. The openings 48 are formed by the channels of a corrugated strip 49 supporting the upstream end of the inner wall of the double-walled structure 22 from the outer wall of this structure.

In the present example the deflectors 27 are arranged across, and downstream of, the gaps between sets of three guide blades 26 as shown in Figures 3, 5 and 6, there being three open gaps 149 between each adjacent pair of deflectors 27. The guide blades 26 are shaped in cross-section as shown in Figures 4 and 6, and the sets of three guide blades 26 associated with the deflectors 27 are each formed as a unit with their associated deflector as shown in Figures 5 and 6, the unit being welded to the wall structure 22 as indicated at 50. The intermediate pairs of guide blades 26 are also formed as units and these are also welded to the structure 22 as indicated at 51. The deflectors 27 are disposed at an angle of 45° to the wall structure 22.

Air passing along the wall structure 22 and through the gaps 149 enters the inlets 48 and passes along the passage 23. Cooling air from the passage 23 passes inwardly through the turbine guide blades 2 as indicated by the arrow 53 and then into a manifold 54 from whence it passes through outlets 55 which direct the air over the roots of the turbine blades 3. Cooling air flowing along the passage between the walls of the inner wall structure passes through openings 56 into the manifold 54 and then through the outlets 55.

Fuel is dispersed into the turbulent zone indicated by the arrows 45 by means of a plurality of fuel vaporizers 60 (see Figure 2). A small amount of air is also admitted to this zone through openings 35, this air being deflected by deflectors 161 to flow smoothly into the toroidal vortex and help maintain the inner fringe of the vortex moving in the required manner.

The fuel vaporizers 60 each comprise a duct 61 having at one end an entry opening 62 located adjacent the outer wall structure 17 and directed so as to receive air from the sheath of air flowing along the wall 17, and at the other end a discharge opening 63 located in the turbulent zone indicated by the arrows 45. Each duct 61 is supported from a fuel injection head 66 carried by the wall structure 17, the head comprising a fuel jet 67 which is arranged to inject fuel into the vaporizing duct adjacent the entry opening 62 to the duct.

The entry openings 62 are directed so as to face upstream of the air flowing in a sheath along the wall structure 17 at the swirl angle of the air so that that air from the sheath may flow smoothly into the ducts 61.

The discharge openings 63 are located adjacent the convergent part of the inner wall structure 16 at the fringe of the turbulent zone indicated by the arrows 45 and the openings 63 are directed generally upstream each at an angle corresponding to the helix angle of the toroidal vortex formed in the turbulent zone during operation of the combustion chamber, so that the fuel air mixture leaving the ducts 61 is introduced smoothly into the vortex.

The inlet 7 to the combustion chamber is provided with a ring of vanes 70 the function of which is to secure the inner and outer wall structures together, and prevent relative axial movement between them under the loads due to the pressure differentials which occur in the combustion chamber and across the guide blades 2. The vanes 70 are curved to flow the general direction of the swirl of the air leaving the compressor, and they may be shaped to reduce this swirl to a small extent consistent with the proper functioning of the combustion chamber.

The cooling air passage within this inner double walled structure is provided adjacent its inlet end with a ring of straightening blades 71 to reduce the swirling motion of air through this cooling air passage.

The axially extending part or shelf 40 in the example just described acts to control the diffusion of the air before it breaks away from the inner surface of the sheath of air flowing over the external wall structure of the combustion chamber as indicated by the arrows 72.

We claim:

1. An annular combustion chamber for use with swirling combustion supporting medium and comprising inner and outer wall structures defining an entry portion, a body portion and an outlet portion of the combustion chamber, the entry portion having an axially directed annular inlet opening, the parts of said inner and outer wall structures adjacent the inlet opening being respectively so directed relatively to the direction of in-flow of combustion supporting medium that during operation of the combustion chamber a greater part of said in-flow is confined and guided solely by said outer wall structure and flows therealong in the form of a sheath, while a lesser part of said in-flow forms a toroidal vortex in a zone between the inner wall structure and the inner surface of the sheath, the parts of the inner and outer wall structures defining the body portion each constituting a continuation in a generally axial direction of the corresponding parts of the wall structure defining the entry portion, and the parts of the inner and outer wall structures defining the outlet portion converging to an annular outlet opening, means for dispensing fuel into the zone of the toroidal vortex, and deflecting means for deflecting during operation of the combustion chamber part of the sheath and gaseous medium flowing along the outer wall structure with a radially inward component of motion to mix with products of combustion leaving the zone of the toroidal vortex, said deflecting means being positioned downstream of said zone but upstream of said annular outlet opening and immediately upstream of said deflecting means, a row of guide blades projecting radially inwardly from the outer wall surface for deflecting gaseous medium entering between them with a substantial circumferential component of motion into a substantially axial direction.

2. A combustion chamber as claimed in claim 1, wherein the part of the inner wall structure defining said entry portion has a part adjacent said annular inlet opening which extends in the axial direction, and a subsequent part which diverges with respect to the axial direction, the wall structure being stepped inwardly between said axially extending part and said divergent part.

3. A combustion chamber as claimed in claim 1, wherein said step is undercut and of part-toroidal shape.

4. A gas turbine engine comprising a compressor and an elongated annular combustion chamber into which the compressor directly discharges compressed gases with circumferential whirl, said annular combustion chamber having inner and outer walls forming an inlet at one end of the combustion chamber and an outlet at the other end of the combustion chamber, said inner and outer walls being shaped to guide a greater part of the compressed gases in the combustion chamber to flow along the outer wall in the form of a sheath and a lesser part of the compressed gases into a toroidal vortex form, fuel injection means in said combustion chamber for injecting fuel into said toroidal vortex and deflecting means in the combustion chamber attached to the outer wall thereof sufficiently far downstream of said fuel injection means to have no effect on the formation of the toroidal vortex, said deflecting means being shaped to deflect at least part of said sheath of gases inwardly to mix with gases leaving the toroidal vortex.

5. A combustion chamber as claimed in claim 4 comprising, immediately upstream of said deflected means, a row of guide blades projecting radially inwardly from the outer wall structure for deflecting gaseous medium entering between them with a substantial circumferential component of motion into a substantially axial direction.

6. A combustion chamber as claimed in claim 5, wherein said deflecting means comprises a plurality of chute-like deflectors arranged across the gaps between sets of said guide blades.

7. A combustion chamber as claimed in claim 6, wherein one of said deflectors is arranged across each alternate gap between adjacent pairs of said guide blades.

8. A combustion chamber as claimed in claim 6, wherein said deflectors are arranged across the gaps between sets of three of said guide blades, there being three open gaps between each adjacent pair of deflectors.

9. A combustion chamber as claimed in claim 1, wherein said fuel dispersing means comprises a plurality of fuel vaporizing ducts in said entry portion, each of said ducts having, at one end, an entry opening located adjacent said outer wall structure and directed upstream of the gaseous medium forming said sheath at the swirl angle of the gaseous medium and at the other end a discharge opening located at the fringe of the zone of said toroidal vortex and are directed generally upstream at an angle corresponding to the helix angle of the toroidal vortex, and for each fuel vaporizing duct, means for injecting fuel into the duct adjacent the entry opening to the duct.

References Cited in the file of this patent

UNITED STATES PATENTS

| | | |
|---|---|---|
| 2,243,467 | Jendrassik | May 27, 1941 |
| 2,503,006 | Stalker | Apr. 4, 1950 |
| 2,541,900 | Williams | Feb. 13, 1951 |
| 2,603,949 | Brown | July 22, 1952 |
| 2,775,864 | Karcher | Jan. 1, 1957 |

FOREIGN PATENTS

| | | |
|---|---|---|
| 967,324 | France | Mar. 22, 1950 |
| 652,991 | Great Britain | May 1, 1951 |
| 666,062 | Great Britain | Feb. 6, 1952 |
| 702,273 | Great Britain | Jan. 13, 1954 |
| 123,595 | Sweden | Dec. 14, 1948 |